United States Patent Office 3,812,029
Patented May 21, 1974

3,812,029
DEVICE FOR INJECTING EASILY COKED FLUIDS INTO A HIGH TEMPERATURE VESSEL
Paul W. Snyder, Jr., Pitman, N.J., assignor to
Mobil Oil Corporation
Filed Oct. 13, 1972, Ser. No. 297,548
Int. Cl. C10g 9/16, 11/18
U.S. Cl. 208—113                     8 Claims

ABSTRACT OF THE DISCLOSURE

Novel oil injector assembly comprising an inner tube, a concentric outer tube, an inner nozzle terminating the inner tube, an outer nozzle terminating the outer tube concentric and forward of the inner nozzle, a vessel into which said nozzles project, means for introducing an easily coked fluid into said inner tube, through said inner nozzle and into said vessel, and means for introducing water, at a temperature and flow rate lower than the temperature and flow rate respectively of said easily coked fluid, into said outer tube, through said outer nozzle and into said vessel.

---

This invention relates to cracking petroleum fractions. It more particularly refers to converting easily coked petroleum fractions into coke and/or light fuel oil.

It is known to convert various petroleum fractions to other, more useful compositions by subjecting them to catalytic or thermal cracking. In particular, it is known to feed various petroleum fractions to catalytic cracking units in order to upgrade the value of these fractions. A fluid bed catalytic cracker is a balanced assembly of apparatus which continuously converts feed in contact with catalyst, removes spent catalyst (coked catalyst) to a regenerator, regenerates coked ctatalyst by burning off the coke and feeds regenerated catalyst back to the cracking reactor. The cracker-regenerator combination is desirably in heat balance so that burning off the coke in the regenerator provides the heat input necessary to sustain the catalytic cracking.

The cracked product of this process is conventionally resolved in a fractionator to a series of products: gas, which goes to a gas plant; gasoline; light cycle gas oil; heavy cycle gas oil and fractionator bottoms. A portion of the heavy cycle gas oil is recycled to the catalytic cracker in admixture with fresh feed. The fractionator bottoms are conventionally subjected to settling with the solid portion of the settled product also being recycled to the catalytic cracker in admixture with heavy cycle oil and fresh feed.

In fluid catalytic cracking, including its modern improved form of transport or riser cracking, the feed mixture picks up regenerated catalyst and flows upwardly into the catalytic cracker in which, after sufficient time has been allowed for cracking to be accomplished, the product comes overhead and the catalyst settles down, via a cyclone separator or the like, into the regenerator.

As the catalytic cracking art has advanced, the catalysts have been improved to the point where there is a danger of upsetting the delicate heat balance in the system due to not enough coke being deposited on the catalyst in the reactor prior to regeneration thereof. This causes the regenerator in which the coke is burned off, to produce less heat input to the whole system. It is necessary that a catalytic cracking system be operated in thermal balance because of economic factors. Therefore, as the catalysts improve, reaction conditions must be varied so as to insure sufficient coke production in the cracking portion of the system. This is, of course, undesirable since it balances improvements in catalyst with impairment of maximum utility of feed.

One of the products which can be taken from the product resolution system of a catalytic cracker assembly to produce coke and improve the heat balance, is a material called slurry oil. This oil comes overhead from the settler referred to above. Clarified slurry oil has a relatively low economic value and, therefore, in the past the art has mainly employed it as a coking stock. It is obvious that with the improved catalyst situation in crackers, it would be desirable to recycle this clarified slurry oil to the catalytic cracker and let it coke on the catalyst so as to balance the thermodynamics of the system. Attempts have, therefore, been made to bypass the settler and simply include this clarified slurry oil as well in the heavy cycle gas oil recycle stream, that is to recycle the entire fractionator bottoms, mix it with fresh feed, contact such mixture with regenerated catalyst and then feed such directly into and through the catalytic cracker.

This obvious procedure has two distinct disadvantages, both related to the fact that the clarified slurry oil is a very readily coked material. In the first place, it tends to coke too fast, that is almost immediately upon contacting the cracking catalyst, and, therefore, tends too rapidly inactivate the cracking catalyst before it has had a chance to crack the other components of the feed to a desired extent. In the second place, since clarified slurry oil is so easily coked, it has a tendency to unduly rapidly plug the feed nozzle.

It is in the prior art, see U.S. Pat. 3,547,805; to feed oil to a system by injecting it thereinto as an annulus surrounding a stream of water. This injector system is not for the purpose of alleviating any premature coking of the oil being fed, but rather is concerned with atomizing the oil feed and mixing it with steam.

U.S. Pat. 3,071,540 discloses a unique nozzle injector system for a fluid catalytic cracking apparatus. According to this patent, a concentric feed injector is used composed of an inside tube terminated with a nozzle and a concentric outside tube terinated with a nozzle which nozzles are concentric. Oil is fed through the inside tube and nozzle into the cracking apparatus while steam or other gas is fed into the cracking apparatus through the outside tube and nozzle. This patent states that it is essential to the operation there disclosed to pass steam or other gaseous material through the outer tube and "nozzle at a sufficiently high velocity to shear the hydrocarbon feed into relatively fine droplets or in an atomized condition." Put another way, the steam or other outer gaseous material may act as a carrier vehicle in a jet pump type of operation actually sucking the oil out of the inner tube and disrupting it upon contact so as to comminute it.

This type of atomizing nozzle is a commercial reality and a very effective means for feeding fresh feed and recycle heavy cycle gas oil to a catalytic cracker in an atomized form. It does not, however, alleviate the problem of feeding easily coked materials to a fluid catalytic cracker in such manner and under such conditions as to retard feed nozzle pluggng.

It is, therefore, an object of this invention to provide a novel injection means for introducing easily coked oil into a catalytic cracker or other vessel.

It is another object of this invention to provide a novel technique for introducing an easily coked fluid into a catalytic cracker or other vessel under relatively high temperature conditions.

It is a further object of this invention to provide a simple, inexpensive technique for feeding relatively easily coked fluids to a vessel under conditions which normally would induce coking of the fluid while reducing or eliminating coke plugging of the feeding means.

It is still further object of this invention to provide a means for increasing the coke formation on cracking catalyst without prematurely deactivating such catalyst.

It is still another object of this invention to provide improved means of increasing the coke content of deactivated catalyst passing from a fluidized bed or riser catalytic cracker to a catalyst regenerator therefor.

Other and additional objects of this invention will become apparent from a consideration of this entire specification including the claims and the drawing hereof.

Understanding of this invention will be facilitated by reference to the accompanying drawing wherein.

An easily coked oil for use in this invention has the following properties:

| | | |
|---|---|---|
| API gravity | | 0 |
| Carbon residue | weight percent | 0.3 |
| 10% boiling point | ° F | 500 |
| Boiling range | ° F | 500 to 1200 |

Preferred oil properties are:

| | | |
|---|---|---|
| API gravity | | −5 to +5 |
| Carbon residue content | weight percent | 1.0 |
| 10% boiling point | ° F | 650 |
| Boiling range | ° F | 650 to 1100 |

A catalytic cracking system, as noted above, comprises a reactor and a regenerator as the major item of apparatus. Fresh (makeup) and regenerated catalyst is introduced into the base of a riser column whereupon it is forced upwardly by means of fresh and recycle petroleum fraction feed. During this upward passage through the riser, the catalyst causes the petroleum feed to crack as desired and to form some amount of coke on the catalyst surface. The fluid bed of coked catalyst and cracked hydrocarbon passes upwardly out of the riser and through a solid-gas separation system such as a cyclone separator. The cracked petroleum fraction is sent to product separation while the coked catalyst continues to pass downwardly to the regenerator where the coke deposits are burned off and the catalyst heated before recycling it to the riser as aforesaid.

According to one aspect of this invention, the point at which the easily coked material is recycled into contact with the catalyst is most important. An easily coked oil as defined above is recycled from the cracked product resolution system, or is obtained elsewhere, and is fed into the fluid catalytic cracker, such as a riser cracker, at a point well downstream of the point of initial entry of the regenerated or fresh catalyst feed and fresh feed-recycle hydrocarbon admixture feed. In the case of riser cracking, this point at which the easily coked oil is fed is a point at least about 40% of the total riser height downstream of the hydrocarbon and recycle catalyst and feed point. A particularly convenient feed point for this easily coked oil is into the bed of deactivated catalyst which collects in the cracking reactor just before passing down to the regenerator.

Figure 1:
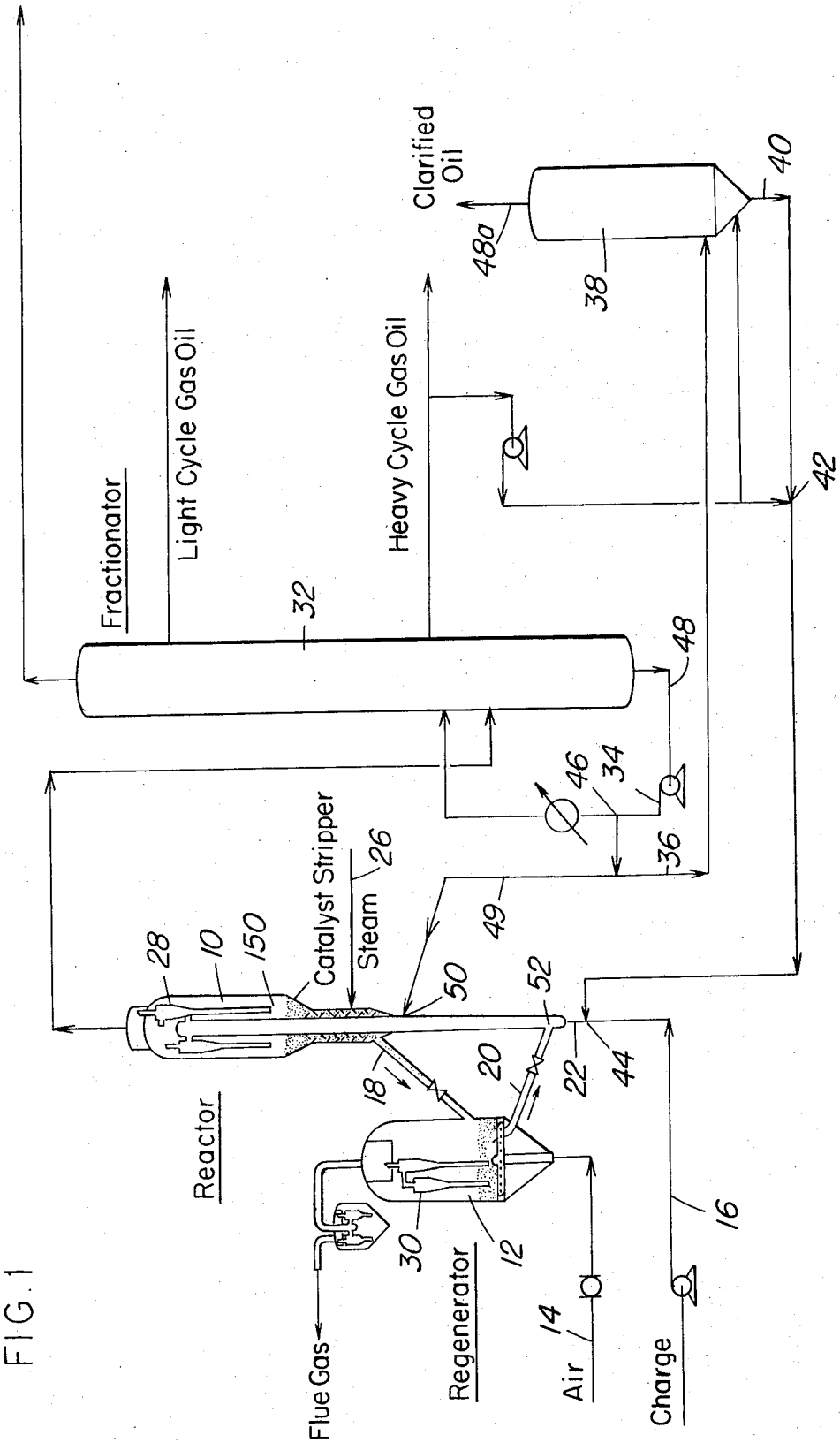
FIG. 1 is a schematic flow sheet of a fluid catalytic cracking system.
Figures 2, 3:
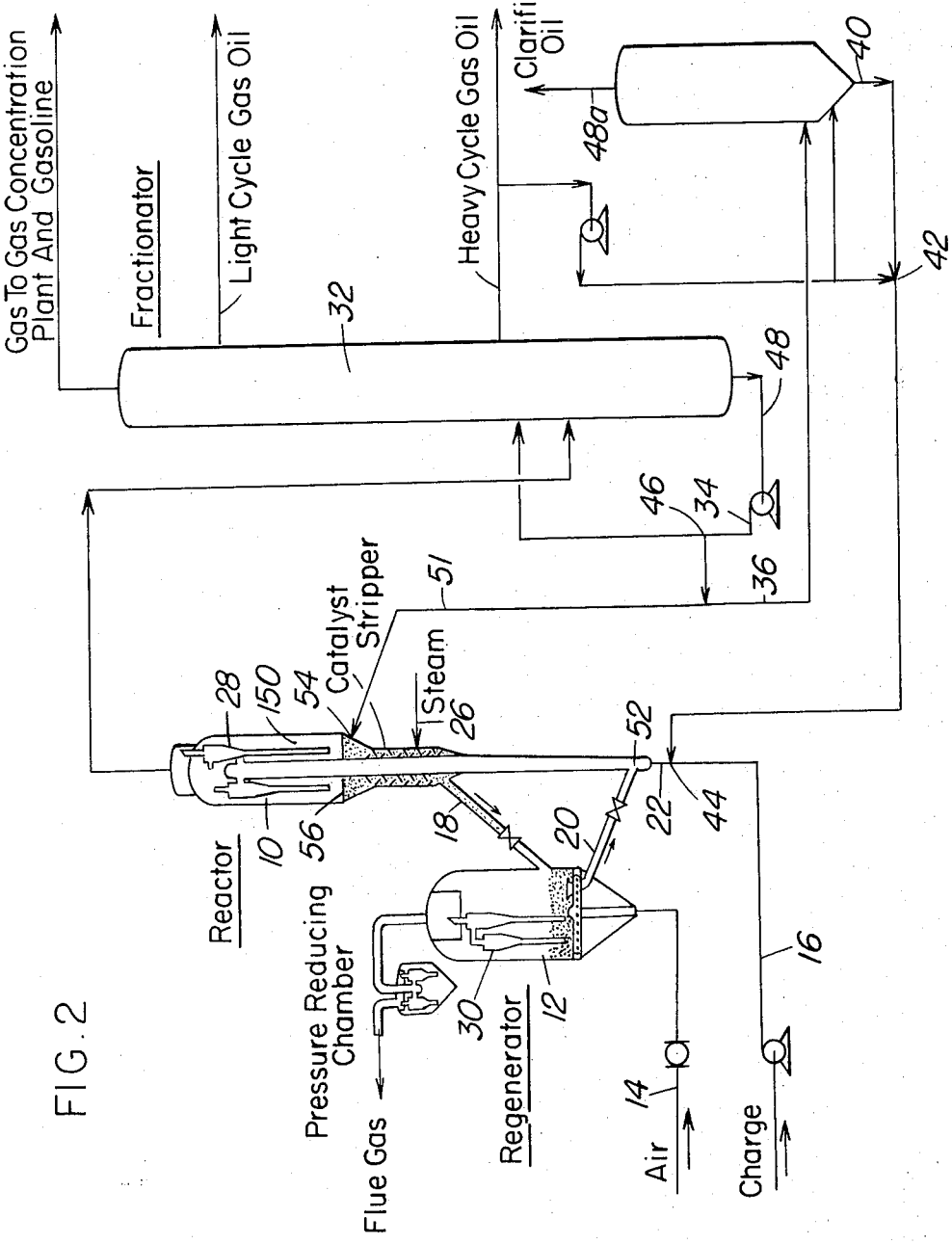
FIG. 2 is similar to FIG. 1 showing a modified flow pattern.
FIG. 3 is a front view in section of an injector assembly according to this invention.

Referring now to the drawing, and particularly to FIGS. 1 and 2 thereof, a conventional fluid catalytic cracking assembly apparatus comprises a reactor 10, a regenerator 12, means 14 to charge air to the regenerator 12, means 16 to charge fresh feed oil to the reactor 10; means 18 to move spent or deactivated catalyst from the reactor 10 to the regenerator 12; means 20 to introduce regenerated catalyst into admixture with oil feed 22 to the reactor 10; a catalyst stripper section 24 of the reactor 10; means 26 to introduce steam into this catalyst stripper section; fluid-solid separation means 28, 30 located in the reactor 10 and the regenerator 12 respectively adapted to separate spent and regenerated catalyst respectively from the fluid product in each reactor; a fractionating column 32 for splitting the fluid effluent product from the reactor into its component fractions including a reboiler 34 and a means 36 to take at least a partial fractionator bottoms stream; slurry settler means 38; means 40 for taking a bottoms product predominantly deactivated catalyst solids from the slurry settler means 38 and means for recycling such ito admixture 42 with a portion of a heavy cycle gas oil cut taken from said fractionator 32, and means 44 for admixing this admixture with the fresh feed.

According to this invention, such conventional catalytic cracking process and apparatus is modified according to FIG. 1 by providing means 46 for splitting the bottoms 48 from the fractionator into a portion 36 to be fed to this slurry settler means 38, and a part 49 to be recycled back into the system at a point 50 at least 40% downstream of the point 52 at which admixture feed oil 22 contacts regenerated catalyst.

The means for recycling the part 49 of the fractionator bottoms is suitably a nozzle means. One or more individual nozzles can make up the nozzle means. If more than one nozzle is used, they should be angularly displaced from each other about the riser column or other apparatus. It is preferred that these multiple nozzles be equidistantly spaced about the apparatus in which they are placed so as not to interfere with each other. In a most preferred configuration, three nozzles are provided spaced apart 120°.

According to another aspect of this invention, such conventional catalytic cracking process and apparatus is modified according to FIG. 2 by providing means 46 for splitting the bottoms 48 from the fractionator 32 into a portion 36 which is fed to the slurry settler 38, and a portion 51 which is recycled into the system.

According to this aspect of this invention, advantage is taken of the fact that spent catalyst leaving the riser of a catalytic cracker settles down into a bed 53 having a top surface 56. This is a dynamic top and bed in that while the level of the top of the bed remains substantially constant, new deactivated catalyst is continually being deposited on the top and material is constantly feeding the regenerator 12 through a line 18 from the bottom of the bed. This bed is steam-stripped to continually remove cracked hydrocarbon therefrom and, therefore, increase the efficiency of the operation. The directly recycled fractionator bottoms portion 51 is fed into this bed of deactivated catalyst 53 at a point 54, preferably through nozzle means as aforesaid.

By feeding easily coked oil, such as fractionator bottoms 51 with the catalyst in the reactor at a point well downstream of the initial feed point 52, the catalyst and admixture feed 22 are permitted to interact together to accomplish most, if not all, of the cracking intended to be effected in the system. Since the fractionator bottoms 51 are so readily converted to coke, this conversion takes place on the first heated surface it contacts. Therefore, feeding such into the system at least about 40% downstream causes it to coke upon contact with the catalyst after the catalyst has accomplished at least most of its work.

Attempts have been made to feed easily coked oil into a fluid catalytic cracker through a relatively conventional nozzle means. It has been found, however, that such conventional nozzle means tend to plug very rapidly because the oil cokes so readily that it cokes upon contacting the hot tip of the nozzle and/or the walls of the vessel immediately inside the nozzle housing. It is, therefore, another important aspect of this invention to provide novel nozzle assembly means for introducing easily coked fluids into a vessel which means includes injector means protruding into said vessel in a well comprising inner and outer concentric tubes, and inner and outer nozzle means terminating said tubes respectively in said vessel in a well comprising inner and outer concentric tubes, and inner and outer nozzle means terminating said tubes respectively in said vessel; means for introducing easily coked fluid into and through said inner tube and nozzle; and means for introducing water, at a temperature and flow rate substantially lower than the temperature and flow rate respectively of said easily coked fluid, into and through said outer tube and nozzle. The referred to well should have a depth slightly greater than the distance the nozzle protrudes from the base wall of the well. This particular configuration protects the nozzle body and top from erosion due to its contacting catalyst particles moving through the system. Yet, the well must be designed to prevent easily coked fluid from contacting the walls thereof because the fluid will coke upon contacting the hot walls of the well and will rapidly bridge across the well mouth impairing the operation of the nozzle.

Contrary to the prior art discussed above, a consideration of the relative flow rates of the oil (easily coked material) and the steam (water) shows that in the prior art the steam is the carrier and atomizing gas flowing at a much higher rate than the oil, whereas in the instant invention, the easily coked material flows substantially faster and is substantially hotter than is the water component. In fact, whereas in the prior art the steam heated, atomized and sped the oil into the vessel, in this invention the water forms a protective shield around the easily coked fluid as it passes into the vessel and keeps it from contacting hot vessel or well surfaces.

It is preferred in the practice of this invention to cause the easily coked material to flow through the injector at about 10 to 30 ft. per second whereas the water or steam flows through the outer tube of the injector at 70 to 80% of this velocity. Similarly, while the easily coked fluid is at a temperature of about 150 to 700° F. as fed, the water temperature, as fed, is only about 80 to 500° C. Most preferably, the water or steam flow rate should be about 7 to 25 ft. per second.

Referring now to FIG. 3, the injector 130 is composed of an inside tube 134 and an outside 136, which preferably have common axes and are, therefore, concentric. Each tube 134 and 136 is terminated on the same end with a nozzle means 138 and 140 respectively. In a preferred aspect of this invention, the two nozzles are concentric and the outer nozzle 138 is forward of the inner nozzle 140. Suitable packing glands 142 and 144 are provided as is conventional practice in the fluid flow art. The injector 130 protrudes into the reactor 10 through a well 146 especially designed and adapted therefore. Clarified slurry oil feed 48 is fed through the inside tube 134 and water 132 is fed through the outside tube 136. Since the oil 48 is traveling faster than the water 132, it drags the water out of the outer tube 136 and may form a combined feed spray 148 which is at the desired cracking inlet temperature.

In a preferred aspect of this invention, the nozzle assembly means 130 should be so positioned in a well 146 that the nozzle tips 138 and 140 do not protrude into the main space of the reactor 150. So positioning the end of the nozzle assembly means will minimize erosion of the nozzle by contact thereof with upwardly rising or downwardly falling catalyst particles and feed oil or cracked product. On the other hand, positioning the nozzle assembly in the well so that the tips are too deep in the well causes part of the spray 148 to contact the well walls whereupon it cokes upon contact restricting the well diameter and eventually plugging the well. It is, therefore, preferred to position the novel nozzle assembly of this invention in a well in the reactor wall so that the tip thereof is about ¼ to 1 diameters of the well back from the reactor wall nine, most preferably about ½ to ¾ diameters.

In another preferred aspect of this invention, the nozzle tip geometry and the relative flow rates of water or steam and oil are controlled so that the water or steam does not particularly admix with the oil but rather forms a sort of protective sleeve or shield around the oil.

While it is probable that the injected oil and water or steam streams do mix at their interface, the intention is to provide the outer edge of the injected stream as substantially only water or steam and the inner portion of the stream substantially only oil with some concentration gradient therebetween.

The following Examples will illustrate the practice of this invention without being in any way limiting on the scope thereof. All parts and percentages are by weight unless expressly stated to the contrary.

EXAMPLE 1

An oil having the following characteristics:

API gravity _____ −2
Carbon residue _____wt. percent__ 9.7
Pour point _____° F__ 40
Kinematic viscosity _____cs. at 100° F__ 814
10% boiling point _____° F__ 679
Boiling range _____° F__ 411 to 833 heated to 700° F. by conventional means is fed into an FCC reactor containing a zeolite cracking catalyst. The operating temperature of the FCC reactor is 1000° F. and the oil has a residence time of 5 seconds in the reactor.

This clarified slurry oil is fed into the reactor at a point about 100 feet above the catalyst introduction point through two 3 inch O.D. inlet pipes located 180° apart with a nozzle having a 1.50 inch I.D. feed tube and a nozzle diameter of 0.95 inch. After a week on stream, coke plugs this nozzle so severely that the equipment would have to be shut down for cleanout in order to be able to continue slurry oil injection.

EXAMPLE 2

Example 1 above is repeated in its entirety except that the same oil is fed through a concentric tube injector according to this invention. The oil at 700° F. is fed through the same diameter tube (1.50 inches) as in Example 1 at the same nozzle flow rate (30 ft./sec.). The outer tube has a larger inside diameter of 1.57 inches. Water at a temperature of 100° C. is fed through the outside concentric tube at 25 ft./sec. and admixed with the oil feed to form a fine spray into the reactor. After several months on stream, this nozzle will still operate effectively and not plugged.

EXAMPLE 3

The same oil as set forth in Example 1 is introduced as recycle into a fluid catalytic cracker as set forth in Example 1 through a feed nozzle of the geometry set forth in Example 2. The difference between this example and Example 2 is that the oil is introduced into the spent catalyst bed downstream of the cone. After several months on stream this nozzle well shows no plugging tendency. The coke yield in this example is increased 30% as compared to operating without oil recycle.

What is claimed is:

1. In the process of catalytically cracking petroleum feedstock which comprises introducing said feedstock in admixture with a fluidizable cracking catalyst into a reaction zone; passing such admixture through said zone at such throughput rate as to maintain said fluidizable catalyst in a suspended state in said feedstock and to carry at least some of said catalyst out of said reaction zone; maintaining said catalyst and said feedstock in said reaction zone for a time and at a temperature and pressure sufficient to crack said feedstock and to coke said catalyst; separating the cracked product of said feedstock and the coked catalyst from each other; regenerating said catalyst; recycling said regenerated catalyst to said reaction zone as aforesaid; and resolving the cracked products to recover at least a lighter gasoline fraction and a heavier easily coked oil fraction having the following properties:

API gravity—up to about 10

Carbon residue content—greater than about 0.3 weight percent
10% boiling point—greater than about 500° F.
Boiling range—about 500 to 1200° F.

the improvement, whereby increasing the coke deposited on said catalyst prior to regeneration thereof without significantly decreasing the cracking catalytic activity thereof, which comprises recycling at least a portion of said heavier easily coked oil fraction to said reaction zone, within a stream of water or steam cojointly fed at a temperature and flow rate less than the temperature and flow rate respectively of said heavier easily coked oil fraction at a point downstream of the point at which said catalyst and said feedstock initially admix, and upstream of said regeneration which recycle point is a distance of at least 40% of the distance from said initial admix to said cracked product separation from said coked catalyst and is at a point where the ambient conditions cause said easily coked oil to be converted to coke on said catalyst upon initial contact therewith 2. The improved process claimed in claim 1 wherein said easily coked oil has the following properties:
API gravity—2 to 8
Carbon residue content—greater than 1 wt. percent
10% boiling point—greater than 650° F.
Boiling range—650 to 1000° F.

3. The improved process claimed in claim 1 wherein said easily coked oil is fractionator bottoms which is fed at a rate of about 5 to 15 vol. percent of the fresh feed.

4. The improved process claimed in claim 3 wherein said easily coked oil is fed at a rate of about 10 to 30 feet per second at a temperature of about 200 to 800° F.

5. The improved process claimed in claim 3 wherein said water is fed at a rate about 70 to 80% of the feed rate of said easily coked oil and is at a temperature of about 100 to 500° F.

6. The improved process claimed in claim 1 wherein said reaction zone is a riser into which said easily coked oil is fed.

7. The improved process claimed in claim 1 wherein said reaction zone is a riser, said cracked product and said coked catalyst are separated by physical means and said coked catalyst forms a bed prior to being fed to regeneration; and wherein said easily coked oil is fed into direct contact with such bed of coked catalyst.

8. The improved process claimed in claim 7 including steam stripping said coked catalyst while simultaneously increasing the coke deposit thereon by impinging said heavier easily coked oil thereon.

References Cited
UNITED STATES PATENTS

| | | | |
|---|---|---|---|
| 2,445,351 | 7/1948 | Gohr | 208—159 |
| 3,071,540 | 1/1963 | McMahon et al. | 208—163 |
| 3,186,805 | 6/1965 | Gomory | 208—153 |
| 3,547,805 | 12/1970 | Mitchell | 208—48 R |
| 3,610,328 | 10/1971 | Larue et al. | 165—134 |
| 3,654,140 | 4/1972 | Griffel et al. | 208—113 |
| 3,692,667 | 9/1972 | McKinney et al. | 208—120 |

DELBERT E. GANTZ, Primary Examiner

G. E. SCHMITKONS, Assistant Examiner

U.S. Cl. X.R.

196—127; 208—48 R, 120, 159, 163, 164; 252—417

PO-1050
(5/69)

UNITED STATES PATENT OFFICE
CERTIFICATE OF CORRECTION

Patent No. 3,812,029               Dated  May 21, 1974

Inventor(s)  Paul W. Snyder, Jr.

It is certified that error appears in the above-identified patent and that said Letters Patent are hereby corrected as shown below:

Column 2, line 38, "terinated" should read --terminated--.

Signed and sealed this 17th day of December 1974.

(SEAL)
Attest:

McCOY M. GIBSON JR.                C. MARSHALL DANN
Attesting Officer                  Commissioner of Patents